United States Patent
Kanno et al.

(10) Patent No.: US 10,403,933 B2
(45) Date of Patent: Sep. 3, 2019

(54) SOLID ELECTROLYTE MATERIAL AND METHOD FOR PRODUCING THE SAME

(71) Applicants: TOKYO INSTITUTE OF TECHNOLOGY, Tokyo-to (JP); TOYOTA JIDOSHA KABUSHIKI KAISHA, Toyota-shi, Aichi-ken (JP)

(72) Inventors: Ryoji Kanno, Yokohama (JP); Satoshi Hori, Machida (JP)

(73) Assignees: TOKYO INSTITUTE OF TECHNOLOGY, Tokyo (JP); TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 15/938,843

(22) Filed: Mar. 28, 2018

(65) Prior Publication Data
US 2018/0287205 A1    Oct. 4, 2018

(30) Foreign Application Priority Data

Mar. 31, 2017 (JP) .................... 2017-070343
Mar. 8, 2018  (JP) .................... 2018-042351

(51) Int. Cl.
    *H01M 10/0562*    (2010.01)
    *H01M 10/052*     (2010.01)
    *C01B 25/14*      (2006.01)

(52) U.S. Cl.
    CPC ......... *H01M 10/0562* (2013.01); *C01B 25/14* (2013.01); *H01M 10/052* (2013.01); *C01P 2002/72* (2013.01); *C01P 2006/40* (2013.01); *H01M 2300/0068* (2013.01)

(58) Field of Classification Search
    None
    See application file for complete search history.

(56) References Cited

U.S. PATENT DOCUMENTS

| | | |
|---|---|---|
| 5,217,826 A | 6/1993 | Yamamura et al. |
| 6,277,524 B1 | 8/2001 | Kanno |
| 2014/0363745 A1 | 12/2014 | Hirayama et al. |
| 2016/0149258 A1 | 5/2016 | Kanno et al. |
| 2017/0155168 A1 | 6/2017 | Kanno et al. |

FOREIGN PATENT DOCUMENTS

| | | |
|---|---|---|
| JP | H06-070906 A  | 3/1994 |
| JP | 3184517 B2    | 7/2001 |
| JP | 3744665 B2    | 2/2006 |
| JP | 2013-149599 A | 8/2013 |
| JP | 5787291 B2    | 9/2015 |
| JP | 2016-027545 A | 2/2016 |
| WO | 2014/196442 A1 | 12/2014 |

OTHER PUBLICATIONS

Takada et al. "Lithium ion conductive oxysulfide, Li3PO4—Li3PS4." Solid State Ionics, 2005, vol. 176, pp. 2355-2359.
Murayama et al. "Material design of new lithium ionic conductor, thio-LISICON, in the Li2S—P2S5 system." Solid State Ionics, 2004, vol. 170, pp. 173-180.
Kanno et al. "Lithium Ionic Conductor Thio-LISICON." Journal of the Electrochemical Society, Jun. 5, 2001, vol. 148, pp. A742-A746.

*Primary Examiner* — Sarah A. Slifka
(74) *Attorney, Agent, or Firm* — Oliff PLC

(57) ABSTRACT

In order to improve the stability of an electrolyte, an object of the present disclosure is to develop, among the sulfide solid electrolytes of Li—P—S—O based containing no metal element other than lithium, a new solid electrolyte having a possibility to have high ion conductivity and a method for producing for obtaining the same easily. The present disclosure achieves the object by providing a solid electrolyte material including a sulfide composition represented by a composition formula $Li_{4-4y-x}P^{4+}_{1+y-x}P^{5+}_{x}S_{4-z}O_{z}$ ($Li_{4-4y-x}P_{1+y}S_{4-z}O_{z}$), wherein $0.6 \leq x < 1$, $0 \leq z \leq 0.2$, and $-0.025 \leq y \leq 0.1$, and a method for producing the same.

8 Claims, 15 Drawing Sheets

X-ray diffraction diagram of z = 0 (not oxygen-doped)

X-ray diffraction diagram of z = 0.1

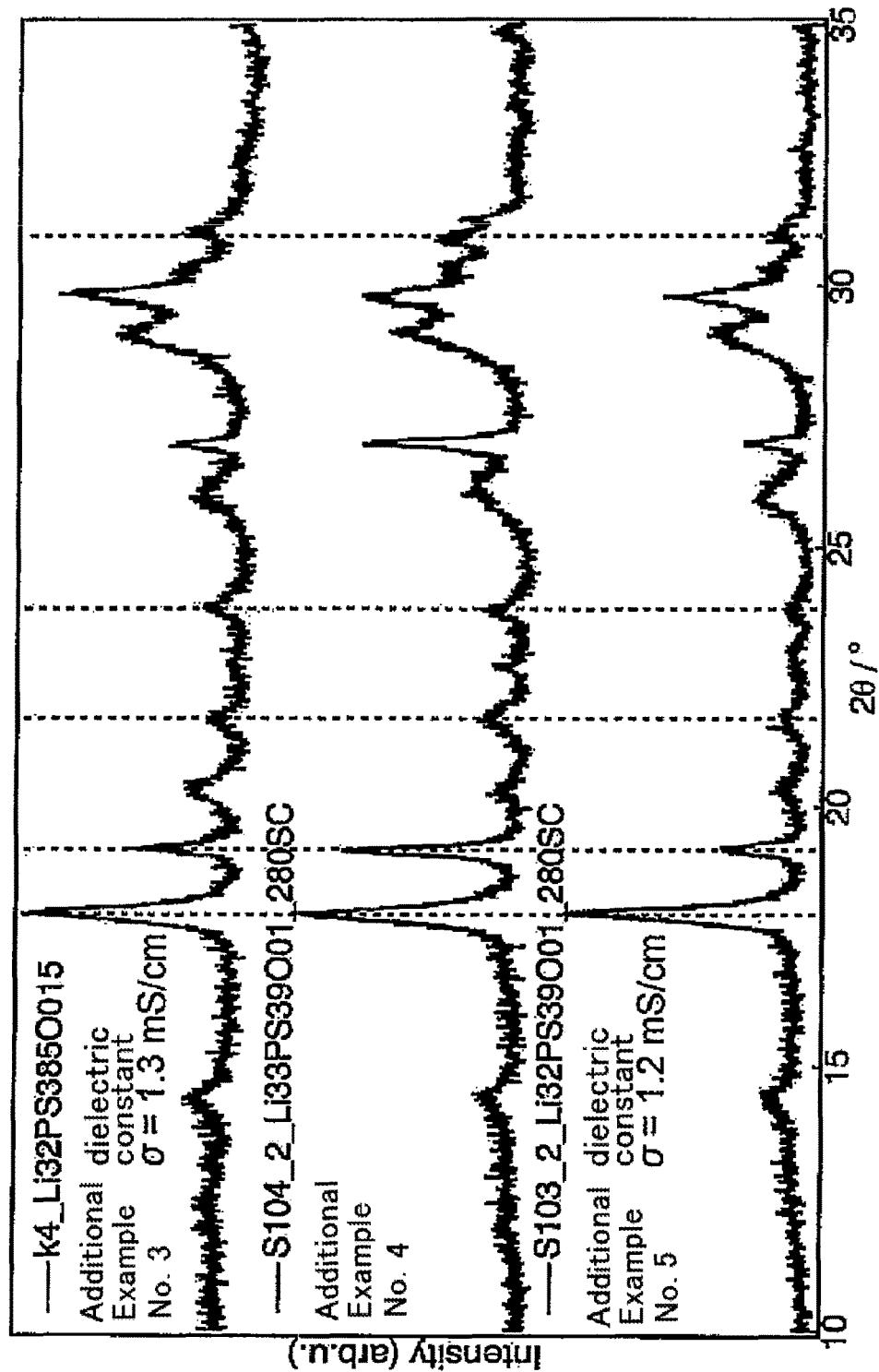

SOLID ELECTROLYTE MATERIAL AND METHOD FOR PRODUCING THE SAME

TECHNICAL FIELD

The present disclosure relates to a solid electrolyte material and a method for producing the same, particularly, to a solid electrolyte material including a Li element, a P (IV) element, a P (V) element, a S element, and an O element.

BACKGROUND ART

In accordance with higher performance of electronic information apparatuses such as a portable telephone, a notebook personal computer, and a tablet personal computer in recent years, a high performance battery for operating these electronic information apparatus for a long time by a single battery charge is desired. Also, for reducing the greenhouse gases and due to rising gasoline prices, hybrid vehicles and electric vehicles became rapidly widely used so that high power and high capacity batteries for operating the motors loaded on these vehicles are desired. As batteries fulfilling such demands, lithium batteries are mainly used currently.

As electrolytes for lithium batteries, flammable organic solvents are currently used for the reasons such as high ion conductivity, a wide potential window, and low cost. However, since the energy density of the lithium batteries are extremely high, the flammable organic solvents are not preferable in light of safety. In order to further improve the safety of the lithium batteries, flame-resistant materials are desirably used for the electrolytes of the lithium batteries. As such flame-resistant materials, inorganic solid electrolytes attract attention.

As for the inorganic solid electrolyte, there are inorganic electrolytes of amorphia such as nitride, oxide, and sulfide; and of crystalline. The followings are known as the sulfide glass solid electrolyte: a three-component glassy solid electrolyte of lithium sulfide, germanium disulfide, and lithium iodide (Patent Literature 1), and a solid electrolyte wherein lithium phosphate exists in lithium ion conductive sulfide glass represented by a general formula $Li_2$—X (Patent Literature 2). The ion conductivities of these are at a level of $10^{-4}$ S/cm. Further, instead of the amorphia, as the crystalline material, a crystalline material having a tetrahedron basic structure of $SiS_4$, $PO_4$, $PS_4$ or $PN_4$ is being researched in hopes of high ion conductivity, and the ion conductivity in a range of $10^{-5}$ S/cm to $10^{-4}$ S/cm is reported for a $Li_2S$—$GeS_2$—$Ga_2S_3$ based solid electrolyte (Patent Literature 3).

Among the solid electrolytes, as a solid electrolyte with extremely high lithium ion conductivity, a sulfide solid electrolyte called sulfide thio-LISICON (thio-LISICON: LIthium SuperIonic CONductor) is known. Among them, the ion conductivity of $Li_{3.25}Ge_{0.25}P_{0.75}S_4$ is $2.2\times10^{-3}$ S/cm, and is the highest among the sulfide thio-LISICON (for example, refer to Non-Patent Literature 1). Further, in order to improve the stability of electrolytes, Li—P—S based and Li—P—S—O based sulfide solid electrolytes are reported as the sulfide thio-LISICON not including a metal element other than lithium (for example, refer to Non-Patent Literatures 2 and 3).

As a solid electrolyte with high conductivity including a Li—P—S—O based sulfide solid electrolyte, Patent Literature 4 proposes a sulfide solid electrolyte represented by a composition formula $Li_{3+5x}P_{1-x}PS_{4-z}O_z$, wherein $0.01 \leq x \leq 0.105$ and $0.01 \leq z \leq 1.55$. Also, Patent Literature 5 proposes a sulfide solid electrolyte material including a composition of $Li_{5x+2y+3}P^{(III)}_y P^{(V)}_{1-x-y}S_4$, wherein $0 \leq x \leq 0.2$ and $0 < y \leq 0.3$.

CITATION LIST

Patent Literatures

Patent Literature 1: Publication of Examined Japanese Patent Application No. H06-70906
Patent Literature 2: Japanese Patent No. 3184517
Patent Literature 3: Japanese Patent No. 3744665
Patent Literature 4: Japanese Patent No. 5787291
Patent Literature 5: WO 2014/196442

Non-Patent Literatures

Non-Patent Literature 1: R. Kanno and M. Murayama, "Lithium Ionic Conductor Thio-LISICON The $Li_2S$—$GeS_2$—$P_2S_5$ System", Journal of The Electrochemical Society, 148 (7), A742-A746 (2001)
Non-Patent Literature 2: M. Murayama, N. Sonoyama, A. Yamada and R. Kanno, "Material design of new lithium ionic conductor, Thio-LISICON, in the $Li_2S$—$P_2S_5$ System", Solid State Ionics, 170, 173-180 (2004)
Non-Patent Literature 3: K. Takeda, M Osada, N. Ohta, T. Inada, A. Kajiyama, H. Sasaki, S. Kondo, M. Watanabe and T Sasaki, "Lithium ion conductive oxysulfide, $Li_3PO_4$—$Li_3PS_4$", Solid State Ionics, 176, 2355-2359 (2005)

SUMMARY OF DISCLOSURE

Technical Problem

However, in light of improving power of the batteries, solid electrolytes having higher ion conductivity and are more stable in battery chemistry are demanded. As mentioned above, for example, a LGPS type sulfide solid electrolyte including Ge is reported to exhibit high ion conductivity; however, higher ion conductivity is demanded, and also, high cost of Ge and low chemical stability such as a reduction-resistance are pointed out. Accordingly, in order to improve the stability of the electrolytes, an object of the present disclosure is to develop, among the Li—P—S—O based sulfide solid electrolytes containing no metal element other than lithium, a new solid electrolyte having a possibility to have high ion conductivity, and a method for producing for obtaining the same easily.

Solution to Problem

In order to achieve the object, the present disclosure employs the following constitutions.
(1) A solid electrolyte material according to the disclosure of claim 1 comprising a sulfide composition represented by a composition formula $Li_{4-4y-x}P^{4+}_{1+y-x}P^{5+}_x S_{4-z}O_z$ ($Li_{4-4y-x}P_{1+y}S_{4-z}O_z$), wherein $0.6 \leq x < 1$, $0 \leq z \leq 0.2$, and $-0.025 \leq y \leq 0.1$.
(2) The disclosure of claim 2 is the solid electrolyte material according to claim 1, wherein the solid electrolyte material has a peak at a position of $2\theta = 29.58°\pm0.50°$ in X-ray diffraction measurement using a CuKα ray, and the solid electrolyte material does not have a peak at a position of $2\theta = 27.33°\pm0.50°$ in X-ray diffraction measurement using a CuKα ray, or when the solid electrolyte material has a peak at the position of $2\theta = 27.33°\pm0.50°$, a diffraction intensity of the peak at $2\theta = 29.58°\pm0.50°$ is regarded as $I_A$, and a diffraction intensity of the peak at 2θ=27.33°±0.50° is regarded as $I_B$, a value of $I_B/I_A$ is less than 0.50.

(3) The disclosure of claim 3 is the solid electrolyte material according to claim 1, wherein the solid electrolyte material has a peak at a position of 2θ=17.90°±0.20°, 29.0°±0.50°, and 29.75°±0.25° in X-ray diffraction measurement using a CuKα ray, and the solid electrolyte material does not have a peak at a position of 2θ=18.50°±0.20° in X-ray diffraction measurement using a CuKα ray, or when the solid electrolyte material has a peak at the position of 2θ=18.50°±0.20°, a diffraction intensity of the peak at 2θ=17.90°±0.20° is regarded as $I_C$, and a diffraction intensity of the peak at 2θ=18.50°±0.20° is regarded as $I_D$, a value of $I_D/I_C$ is less than 0.50.

(4) The disclosure of claim 4 is the solid electrolyte material according to claim 1, wherein the solid electrolyte material has a peak at a position of 2θ=18.00±0.1°, 19.4°±0.1°, 21.9°±0.1°, 24.0°±0.1° and 31.3°±0.1° in X-ray diffraction measurement using a CuKα ray.

(5) The disclosure of claim 5 is the solid electrolyte material according to claim 1, wherein the solid electrolyte material has a peak at a position of 2θ=17.8°±0.1°, 19.1°±0.1°, 21.7°±0.1°, 23.8°±0.1° and 30.85°±0.1° in X-ray diffraction measurement using a CuKα ray.

(6) The disclosure of claim 6 is the solid electrolyte material according to claim 1, wherein ion conductivity is 0.4 mS/cm or more.

(7) The disclosure of claim 7 is a method for producing the solid electrolyte material according to claim 1, the method including: an ion conductive material synthesizing step of synthesizing an ion conductive material using a simple substance of P, a P compound, a S compound, a Li compound, and an O compound as a raw material including a constituent of the sulfide composition; and a heating step of obtaining the sulfide composition by heating the ion conductive material.

(8) The disclosure of claim 8 is the method for producing the solid electrolyte material according to claim 7, wherein a heating temperature in the heating step is in a range of 230° C. to 300° C.

Advantageous Effects of Disclosure

According to the present disclosure, a solid electrolyte material including a Li—P—S—O based sulfide solid electrolyte, and having high ion conductivity and high chemical stability may be obtained easily.

BRIEF DESCRIPTION OF DRAWINGS

FIG. 12B is a diagram showing X-ray diffraction measurement results in which the new phase B was confirmed.

DESCRIPTION OF EMBODIMENTS

As the result of dedicated researches, the present inventors have found out that a solid electrolyte material including a sulfide composition represented by a composition formula $Li_{4-4y-x}P^{4+}_{1+y-x}P^{5+}_xS_{4-z}O_z$, ($Li_{4-4y-x}P_{1+y}S_{4-z}O_z$), wherein 0.6≤x<1, 0≤z≤0.2, and −0.025≤y≤0.1 has high ion conductivity and high chemical stability, and may be easily produced. Thereby, the present disclosure has been achieved. Although the present disclosure will be hereinafter described in detail, the present disclosure is not limited to the following embodiments.

<Sulfide Solid Electrolyte>

Figure 1:
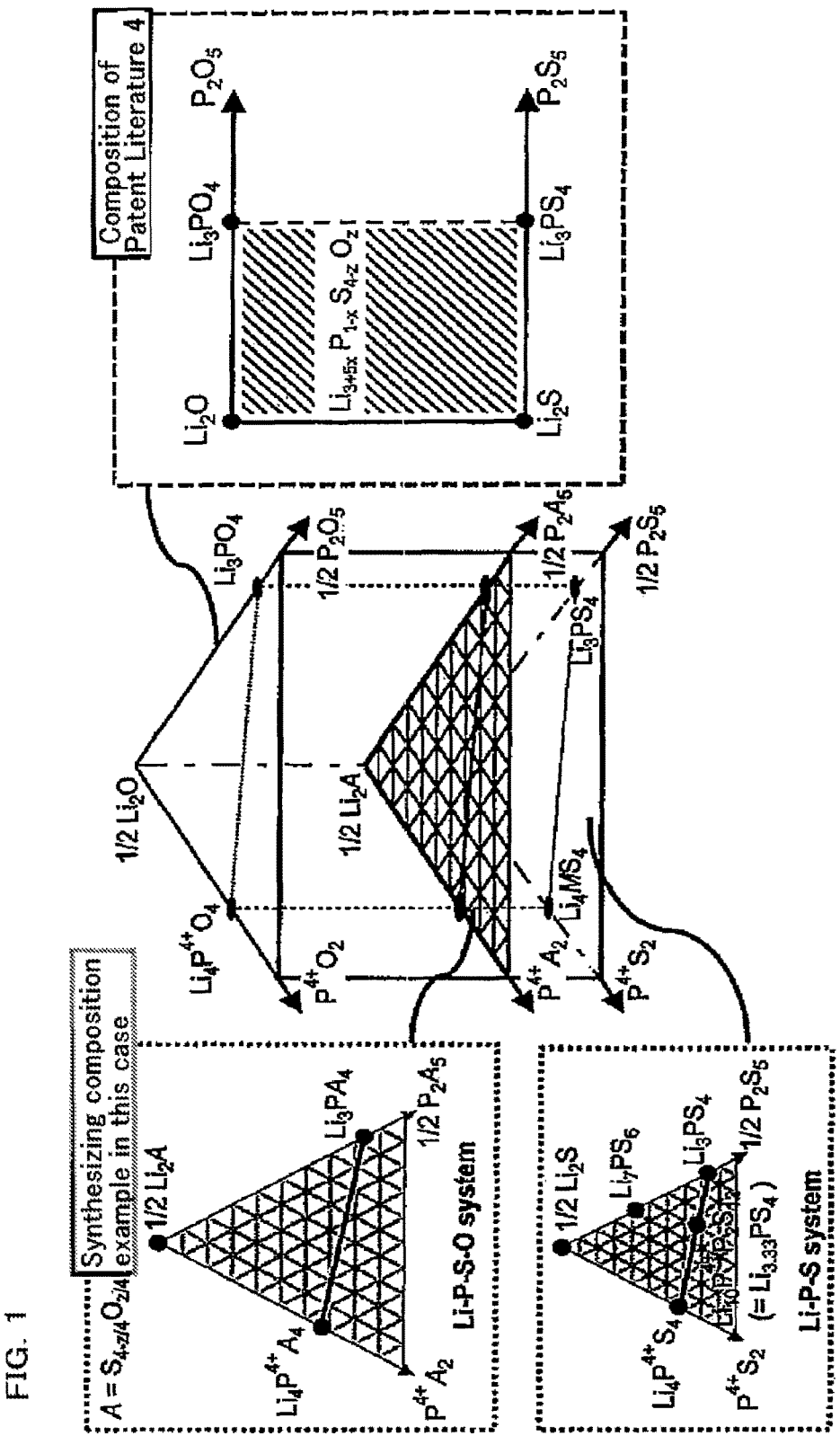
FIG. 1 is a composition diagram of a triangular prism shape of $Li_2S—PS_2—P_2S_5—Li_2O—PO_2—P_2O_5$ based showing a composition range of the sulfide solid electrolyte in the present disclosure.

The sulfide solid electrolyte (sulfide composition) in the present disclosure will be explained referring to a composition diagram of a triangular prism shape of $Li_2S—PS_2—P_2S_5—Li_2O—PO_2—P_2O_5$ based shown in FIG. 1. The bottom surface of this triangular prism shaped composition diagram is a ternary diagram of a sulfide, and the top surface thereof is a ternary diagram of an oxide; the sulfide component increases toward the lower side of the triangular prism, and the oxide component increases toward the upper side of the triangular prism. In more detail, the sulfide ternary diagram at the bottom surface is a ternary diagram of $Li_2S-P^{(4+)}S_2-P^{(5+)}_2S_5$ (Li—P—S system of lower left of FIG. 1), and the oxide ternary diagram at the top surface is a ternary diagram of $Li_2O-P^{(4+)}O_2-P^{(5+)}_2O_5$ The sulfide solid electrolyte in the present disclosure has a composition that is plotted inside (excluding sides) the triangular prism, and the composition formula may be represented by $Li_{4-4y-x}P^{4+}_{1+y-x}P^{5+}_xS_{4-z}O_z$ (=$Li_{4-4y-x}P_{1+y}S_{4-z}O_z$). Here, z is a factor relating the ratio of S and O. The case where z=0 corresponds to the bottom surface (a sulfide ternary diagram), and the case where z=1 corresponds to the top surface (an oxide ternary diagram); as z increases from 0, the composition includes more oxygen and the plot in the triangular prism moves toward the top surface. The factors x and y will be explained referring to the ternary diagram of Li—P—S—O system shown in the upper left of FIG. 1. This ternary diagram is a face cut out from the triangular prism at z selected in the range of 0<z<1, and the apexes of the triangle are $1/2Li_2A$, $P^{4+}A_2$, and $1/2P^{5+}2A_5$. Incidentally, A is a mixture of S and O, and $A=S_{4-z/4}O_{z/4}$. In this ternary diagram, x is a factor relating the ratio of pentavalent P ($P^{5+}$), and will be plotted closer to the apex $1/2P^{5+}_2A_5$ (lower right of the ternary diagram), as x increases. Also, y is a factor relating the ratio of tetravalent P ($P^{4+}$), and will be plotted closer to the apex $P^{4+}A_2$ (lower left of the ternary diagram), as y increases. The composition ratio (4-4y-x) of Li is determined by the relationship between x and y.

The sulfide solid electrolyte in the present disclosure is represented by the composition formula $Li_{4-4y-x}P^{4+}_{1+y-x}P^{5+}_xS_{4-z}O_z$ ($=Li_{4-4y-x}P_{1+y}S_{4-z}O_z$), wherein $0.6 \le x < 1$, $0 \le z \le 0.2$, and $-0.025 \le y \le 0.1$. In other words, a feature of the sulfide solid electrolyte in the present disclosure is that it includes a tetravalent P. For reference, Patent Literature 4 discloses a sulfide solid electrolyte including the composition formula $Li_{3+5x}P_{1-x}S_{4-z}O_z$; however, this is plotted in the ternary diagram having $Li_2S$, $Li_2S_5$, and $P_2O_5$ at the apexes, includes a pentavalent P and does not include the tetravalent P. When it is plotted in the triangular prism of FIG. 1, it is plotted on the side surface at the right side of the triangular prism, and it is not the composition inside of the triangular prism. That is, the sulfide solid electrolyte in the present disclosure has a composition different from that of, for example, Patent Literature 4.

Also, a feature of the sulfide solid electrolyte in the present disclosure is that it includes oxygen (O), that is, it includes an oxide. The oxide is generally excellent in chemical stability so that improves the chemical stability of the sulfide solid electrolyte in the present disclosure. Also, the sulfide solid electrolyte has a peculiar crystal structure, and is thought that it obtains high ion conductivity due to the peculiar crystal structure such as a tunnel structure through which an ion is able to pass. When a part of S in the crystal structure is substituted with the oxygen (O), an ion conductivity improving effect may be expected due to the shape change of the tunnel that contributes to the ion conductivity. A range of factor z relating the oxygen content is in a range of $0 \le z \le 0.2$. However, although the above mentioned effect is generally higher as the content of the oxygen (O) increases, when the content of the oxygen (O) is too much, a desired crystal structure may not be obtained in some cases. Accordingly, the lower limit of factor z relating the content of the oxygen (O) may be preferably more than 0, more preferably 1 or more, and further preferably more than 1. The upper limit of factor z may be preferably less than 2, more preferably 1.8 or less, or less than 1.8, and further preferably 1.5 or less, or less than 1.5.

The sulfide solid electrolyte in the present disclosure is represented by the composition formula $Li_{4-4y-x}P^{4+}_{1+y-x}P^{5+}_xS_{4-z}O_z$ ($=Li_{4-4y-x}P_{1+y}S_{4-z}O_z$), wherein $0.6 \le x \le 1$, $0 \le z \le 0.2$, and $-0.025 \le y \le 0.1$. In this composition range, a sulfide solid electrolyte having various crystal structures has been confirmed, and due to the respective crystal structure, excellent ion conductivity was also confirmed. The sulfide solid electrolyte in the present disclosure may include a LGPS type crystal structure, an α type crystal structure (crystal structure found in α phase of $Li_3PS_4$), and a β type crystal structure (crystal structure found in β phase of $Li_3PS_4$) in some cases. These crystal structures are conventionally known to have ion conductivity, and the sulfide solid electrolytes having the crystal structure are also expected to have ion conductivity. Further, surprisingly, in the above described composition range in the present disclosure, a new crystal structure different from the conventionally known crystal structures was also found, and the ion conductivity thereof was also confirmed. The followings will explain in each crystal structure. Incidentally, respective crystal structure is capable of being identified by the peak position in X-ray diffraction measurement using a CuKα ray. The sulfide solid electrolyte in the present disclosure may be in a multiphase state in which a plurality of crystal structures coexist. For example, the composition in the present disclosure may include a LGPS type crystal structure and an α type crystal structure, and overlaps of these peaks may be detected in X-ray diffraction measurement.

The sulfide solid electrolyte in the present disclosure may include the crystal structure of a LGPS type sulfide solid electrolyte. Also, the sulfide solid electrolyte may have a peak at a position of $2\theta=29.58°\pm0.50°$ in X-ray diffraction measurement using a CuKα ray; and the sulfide solid electrolyte may not have a peak at a position of $2\theta=27.33°\pm0.50°$ in X-ray diffraction measurement using a CuKα ray, or when the sulfide solid electrolyte has a peak at the position of $2\theta=27.33°\pm0.50°$, a diffraction intensity of the peak at $2\theta=29.58°\pm0.50°$ is regarded as $I_A$, and a diffraction intensity of the peak at $2\theta=27.33°\pm0.50°$ is regarded as $I_B$, a value of $I_B/I_A$ may be less than 0.50. This peak is found in the crystal structure of the LGPS type sulfide solid electrolyte, and has excellent ion conductivity.

The specification of $I_B/I_A$ will be explained. The LGPS type sulfide solid electrolyte sometimes includes those other than the crystal structure of the LGPS type having high ion conductivity, and for example, sometimes includes a crystal phase having a peak in the vicinity of $2\theta=27.33°$. The ion conductivity of the crystal phase having a peak in the vicinity of $2\theta=27.33°$ is not high. Therefore, in the sulfide solid electrolyte in the present disclosure, in order to distinguish from the sulfide solid electrolyte having low ion conductivity, the value of $I_B/I_A$, when the diffraction intensity of the peak in the vicinity of $2\theta=29.58°$ is regarded as $I_A$ and the diffraction intensity of the peak in the vicinity of $2\theta=27.33°$ is regarded as $I_B$, is specified to be less than 0.50. From the viewpoint of the ion conductivity, the proportion of the crystal phase having high ion conductivity (having a peak at the position of $2\theta=29.58°$) in the sulfide solid electrolyte in the present disclosure is preferably high. Therefore, the value of $I_B/I_A$ is preferably lower, and specifically, is preferably 0.45 or less, more preferably 0.25 or less, further preferably 0.15 or less, and particularly preferably 0.07 or less. Also, the value of $I_B/I_A$ is preferably 0. In other words, the sulfide solid electrolyte in the present disclosure does not preferably have a peak in the vicinity of $2\theta=27.33°$. The sulfide solid electrolyte in the present disclosure may be a solid electrolyte having excellent ion conductivity, when the proportion of the crystal phase having a peak in the vicinity of $2\theta=29.58°$ is high.

Here, the peak position of $2\theta=29.58°$ is an actual measured value, and the peak position may slightly vary from $2\theta=29.58°$ due to the slight change of the crystal lattice according to, for example, the material composition. Accordingly, the peak is defined as the peak at the position of $29.58°\pm0.50°$. Since the LGPS type sulfide solid electrolyte having high ion conductivity is usually thought to have the peaks at $2\theta=17.38°$, $20.18°$, $20.44°$, $23.56°$, $23.96°$, $24.93°$, $26.96°$, $29.07°$, $29.58°$, $31.71°$, $32.66°$, and $33.39°$, the sulfide solid electrolyte in the present disclosure also may have these peaks. Incidentally, these peak positions also may vary in a range of t $0.50°$ in some cases.

Meanwhile, as described above, the peak in the vicinity of $2\theta=27.33°$ is one of the peak of the crystal phase having low ion conductivity. Here, $2\theta=27.33°$ is an actual measured value, and the peak position may slightly vary from $2\theta=27.33°$ due to the slight change of the crystal lattice according to, for example, the material composition. Accordingly, the peak of the crystal phase having low ion conductivity is defined as the peak at the position of 27.33°±0.50°. The crystal phase having low ion conductivity is usually thought to have the peaks at 2θ=17.46°, 18.12°, 19.99°, 22.73°, 25.72°, 27.33°, 29.16°, and 29.78°. Incidentally, these peak positions also may vary in a range of ±0.50° in some cases.

The sulfide solid electrolyte in the present disclosure may include an α type crystal structure (crystal structure found in α phase of $Li_3PS_4$). Also, the sulfide solid electrolyte may have a peak at a position of 2θ=17.90°±0.20°, 29.0°±0.5°, and 29.75°±0.25° in X-ray diffraction measurement using a CuKα ray; and when a diffraction intensity of the peak at 2θ=17.90°±0.20° is regarded as $I_C$, and a diffraction intensity of the peak at 2θ=18.50°±0.20° is regarded as $I_D$, a value of $I_D/I_C$ may be less than 0.50. This peak is found in the α type crystal structure (crystal structure found in α phase of $Li_3PS_4$), and has excellent ion conductivity and excellent electrochemical stability.

The specification of $I_D/I_C$ in relation to the α type crystal structure will be explained. Although not desiring to be bound by a specific theory, the peak of $I_C$ is one factor of the distinguishing peak of the solid electrolyte having the α type crystal structure, and the crystal structure generating this peak $I_C$ is thought to be related to the ion conductivity and the chemical stability. In other words, when the peak of $I_C$ is more clear, the crystal structure excellent in the ion conductivity and the electrochemical stability is thought to be formed. When the peak of $I_D$ (in a range of 2θ=18.50°±0.20°) exists in relatively vicinity of $I_C$, the crystal structure generating the peak of $I_D$ is formed, and the crystal structure generating the peak of $I_C$ is not likely to be formed relatively so that the ion conductivity and the electrochemical stability are thought to be deteriorated.

Accordingly, from the viewpoint of the ion conductivity and the electrochemical stability, the value of $I_D/I_C$ in the sulfide solid electrolyte in the present disclosure is preferably lower. Specifically, it is preferably 0.4 or less, more preferably 0.3 or less, more preferably 0.2 or less, and further preferably 0.1 or less. Also, the value of $I_D/I_C$ is preferably 0. In other words, the sulfide solid electrolyte having this α type crystal structure does not preferably have a peak in a range of 2θ=18.50°±0.20° that is the peak position of $I_D$.

Figure 2A:
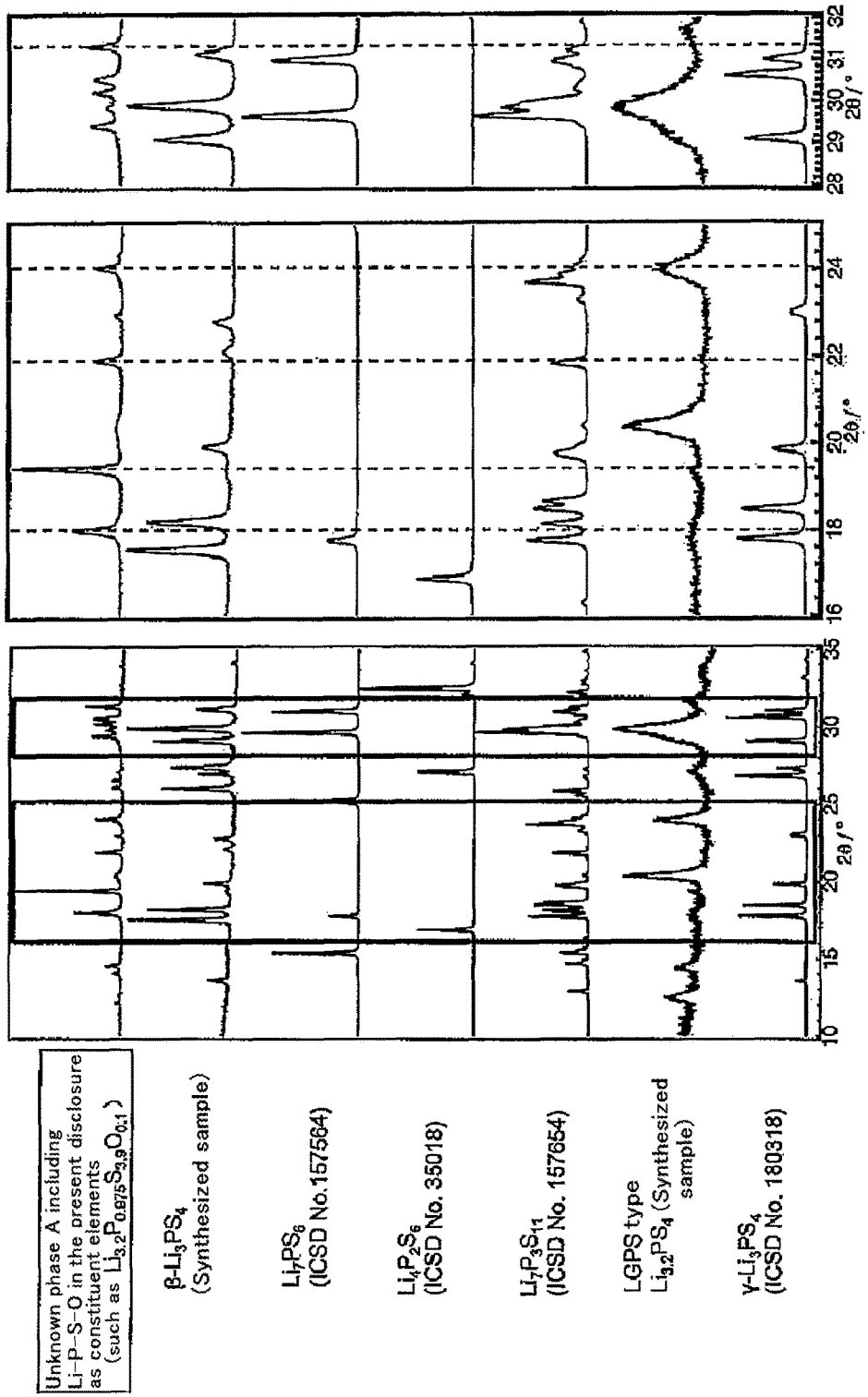
FIG. 2A is a diagram showing the X-ray diffraction peaks found in a new phase A and various crystal structures.

The sulfide solid electrolyte in the present disclosure may include a new crystal structure A different from the conventionally known crystal structures. The new crystal structure A has a peak at a position of 2θ=18.0°±0.1°, 19.4°±0.1°, 21.9°±0.1°, 24.0°±0.1° and 31.3°±0.1° in X-ray diffraction measurement using a CuKα ray. This is different from the above described LGPS type crystal structure, α type crystal structure (crystal structure found in α phase of $Li_3PS_4$), and a β type crystal structure (crystal structure found in β phase of $Li_3PS_4$). FIG. 2A shows a comparison of the X-ray diffraction peak found in the new crystal structure A with the X-ray diffraction peak found in the Li—P—S based solid electrolyte conventionally know to have a crystal structure. From this comparison, it is clear that the new crystal structure A is different from the conventionally know crystal structures. The new crystal structure A has a large peak particularly at the position of 19.4°±0.1°, and the peaks other than that are relatively small. Even when the new crystal structure A is multiphased with other crystal structures so that the small peak of the new phase A is immersed in the peaks of other crystal structures, if the peak of 19.40±0.1° clearly project, the existence of the new phase is suggested.

Figure 2B:
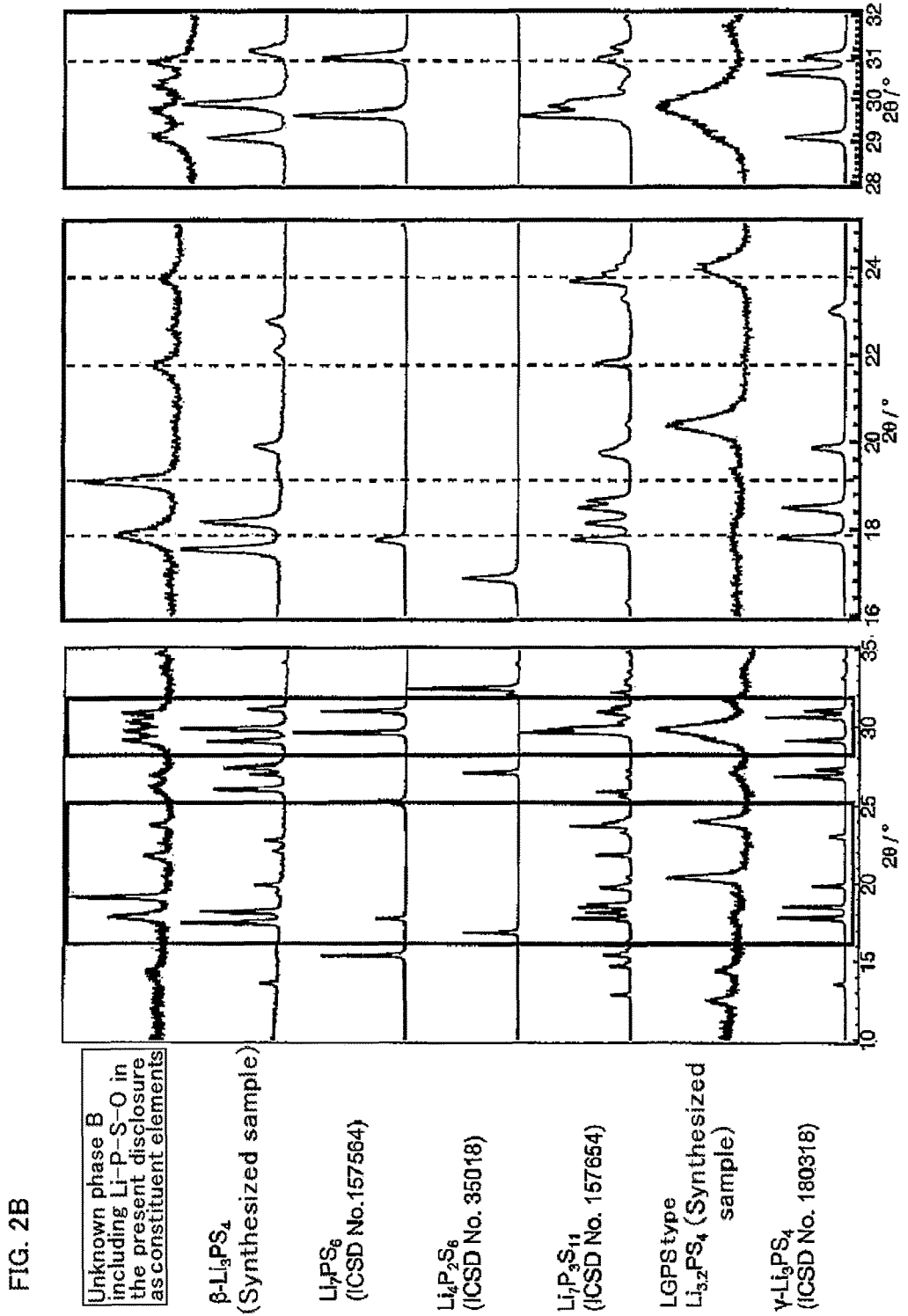
FIG. 2B is a diagram showing the X-ray diffraction peaks found in a new phase B and various crystal structures.

Also, the sulfide solid electrolyte in the present disclosure may include a new crystal structure B different from the conventionally known crystal structures. The new crystal structure B has a peak at a position of 2θ=17.8°±0.1°, 19.1°±0.1°, 21.7°±0.1°, 23.8°±0.1° and 30.85°±0.1° in X-ray diffraction measurement using a CuKα ray. This is different from the above described LGPS type crystal structure, α type crystal structure (crystal structure found in α phase of $Li_3PS_4$), a β type crystal structure (crystal structure found in β phase of $Li_3PS_4$), and new crystal structure A. FIG. 2B shows a comparison of the X-ray diffraction peak found in the new crystal structure B with the X-ray diffraction peak found in the Li—P—S based solid electrolyte conventionally know to have a crystal structure. From this comparison, it is clear that the new crystal structure B is different from the conventionally know crystal structures. The new crystal structure B has a large peak particularly at the position of 19.1°±0.1°, and the peaks other than that are relatively small. Even when the new crystal structure B is multiphased with other crystal structures so that the small peak of the new phase B is immersed in the peaks of other crystal structures, if the peak of 19.1°±0.1° clearly project, the existence of the new phase is suggested.

The sulfide solid electrolyte in the present disclosure may have various crystal structures, and is expected to have high ion conductivity. The ion conductivity of the sulfide solid electrolyte in the present disclosure may be preferably 0.4 mS/cm or more, more preferably 0.5 mS/cm or more, further preferably 0.6 mS/cm or more, more preferably 0.7 mS/cm or more, more preferably 0.8 mS/cm or more, further preferably 0.9 mS/cm or more, and more preferably 1.0 mS/cm or more.

The measurement of the ion conductivity may be carried out in the following manner.

A pellet is produced by charging the ground sample into a cell for sintered pellet, and then, applying the pressure of approximately 169 MPa to a cell for normal temperature. Then, a sintered pellet including the solid electrolyte material of various compositions is obtained by sintering for 12 hours at 550° C. The sample for measuring is produced so as the radius of the pellet is approximately 10 mm and the thickness is in a range of 1 mm to 2 mm. Au electrodes are stuck together to the sample for measuring to obtain a battery of Au/sample for measuring/Au. A Frequency Response Analyzer manufactured by NF Corporation is used for measuring the ion conductivity of the sample for measuring. The alternating current impedance measurement is carried out to measure the ion conductivity of the sample under the following conditions: the measuring range of 15 MHz to 100 Hz, the measuring temperature of 26° C. to 127° C., the alternating voltage of 50 mV to 100 mV, and the integrating time of 2 seconds.

Since the solid electrolyte material according to the present disclosure has high ion conductivity and high chemical stability, it may be used in any use application requiring ion conductivity and chemical stability. Among the above, the solid electrolyte material according to the present disclosure is preferably used for a battery. This is because it may contribute to the improvement of the battery power greatly. Also, the solid electrolyte material according to the present disclosure is a material including at least a sulfide composition (sulfide solid electrolyte), may include nothing but the sulfide composition (sulfide solid electrolyte), and may further include other compound (such as a binder).

The method for producing the solid electrolyte material according to the present disclosure will be explained. The method for producing the solid electrolyte material according to the present disclosure is a method for producing the solid electrolyte material according to the above described present disclosure, the method including: an ion conductive material synthesizing step of synthesizing an ion conductive material using a simple substance of P, a P compound, a S compound, a Li compound, and an O compound as a raw material including a constituent of the sulfide composition; and a heating step of obtaining the sulfide composition by heating the ion conductive material.

In the present disclosure, a simple substance of P, a P compound, a S compound, a Li compound, and an O compound are used as raw materials. The simple substance of P is a pure phosphorus, and the valence of P here is zero valent ($P^0$). The P compound may be an oxide (such as $P_2O_5$), a sulfide (such as $P_2S_5$), or a phosphorus oxide (such as $Li_3PO_4$ and $H_3PO_4$), and the valence of P here is pentavalent ($P^{5+}$). The S compound is a sulfide, may be a sulfide or a sulfate of other raw material element, and may be, for example, $P_2S_5$, $Li_2S$, or $Li_2SO_4$. The Li compound may be an oxide, a sulfide, or a phosphate of other raw material element, and may be, for example, $Li_2O$, $Li_2S$, $Li_2SO_4$, or $Li_3P^{5+}O_4$. The O compound may be an oxide of the other raw material element, and may be, for example, $Li_2O$, $Li_2SO_4$, $Li_3P^{5+}O_4$, or $P^{5+}{}_2O_5$.

Here, the phosphorus (P) whose valence is zero valent and the phosphorus (P) whose valence is pentavalent are used as the raw materials in the present disclosure. The oxidation-reduction reaction between the pentavalent P and the zero valent P occurs (the pentavalent P is oxidized whereas the zero valent P is reduced) in the ion conductive material synthesizing step and in the heating step, as the result, the quatrovalent P ($P^{4+}$) occurs. By this, the sulfide solid electrolyte (sulfide composition) in the present disclosure includes the quatrovalent P.

Each raw material is preferably used according to the composition ratio so that the sulfide solid electrolyte has a desired composition formula.

The ion conductive material synthesizing step will be explained. In the ion conductive material synthesizing step, the crystallinity of the raw material is firstly deteriorated by micronizing the raw material by the mechanical milling. By once deteriorating the crystallinity of the crystalline raw material, the environment in which the sulfide solid electrolyte with the crystal structure having high electrochemical stability and high ion conductivity is likely to be deposited may be provided. The micronizing is desirably carried out to an extent that the desired peak of the raw material is made broad enough so that the environment in the end objective sulfide solid electrolyte will be the environment in which the crystal phase having the desired peak is likely to be deposited. All of the raw material may be micronized, whereas only a portion may be micronized. Particularly, it is preferable to micronize a compound (such as $Li_2S$) including the Li element. The compound including the Li element has high crystallinity in many cases, and the remaining of such crystalline Li compound may possibly inhibit the deposition of the end objective sulfide solid electrolyte.

Mechanical milling is a method of grinding a raw material while applying a mechanical energy thereto. The raw material is micronized to deteriorate the crystallinity thereof by applying a mechanical energy to the raw material. Examples of such mechanical milling may include vibrating mill, ball mill, turbo mill, mechano-fusion, and disk mill; above all, ball mill and vibrating mill are preferable.

The conditions of ball mill are not particularly limited if the conditions are such as to allow the micronized raw material to be obtained. Generally, larger number of revolutions brings higher micronizing rate, and longer treating time proceeds the micronization. The number of weighing table revolutions in performing planetary ball mill is in a range of 200 rpm to 700 rpm, for example, and preferably in a range of 250 rpm to 600 rpm, above all. Also, the treating time in performing planetary ball mill is in a range of 1 hour to 100 hours, for example, and preferably in a range of 1 hour to 70 hours, above all. Particularly, in order to sufficiently micronizing the compound (such as $Li_2S$) including the Li element, it is preferable to micronize by the ball mill for 10 hours to 40 hours.

The conditions of vibrating mill are not particularly limited if the conditions are such as to allow the micronized raw material to be obtained. The vibration amplitude of vibrating mill is in a range of 5 mm to 15 mm, for example, and preferably in a range of 6 mm to 10 mm above all. The vibration frequency of vibrating mill is in a range of 500 rpm to 2000 rpm, for example, and preferably in a range of 1000 rpm to 1800 rpm above all. The filling factor of a sample of vibrating mill is in a range of 1% by volume to 80% by volume for example; above all, preferably in a range of 5% by volume to 60% by volume, and particularly preferably in a range of 10% by volume to 50% by volume. Also, a vibrator (such as a vibrator made of alumina) is preferably used for vibrating mill. Generally, vibrating mill is inferior to ball mill in grinding efficiency; however, since a compound (such as $P_2O_5$ and $P_2S_5$) including the P element is micronized easily compared to the compound (such as $Li_2S$) including the Li element, the micronization by vibrating mill is suitable. The compound (such as $P_2O_5$ and $P_2S_5$) including the P element may be sufficiently micronized even by vibrating mill treatment for approximately 30 minutes.

Also, since the simple substance of P (pure phosphorus) is further easily micronized, it may be mixed by hand for approximately 5 minutes.

Next, the amorphized ion conductive material is synthesized by mixing the micronized raw materials.

The ion conductive material is obtained by weighing and mixing the raw material so that the composition is in the above describes preferable composition range.

The amorphized ion conductive material may be synthesized by firstly mixing each micronized raw material by hand, and further, sufficiently mixing by machinery mixing such as ball mill. The various mechanical milling used in the micronization may be used as a machinery mixing method, under the similar conditions. In addition to the micronization, by also utilizing mechanical milling in synthesizing, the amorphized ion conductive material may be synthesized by further deteriorating the crystallinity of the raw material and mixing the raw materials uniformly with each other. For sufficiently mixing, it is preferable to micronizing by ball mill for 10 hours to 40 hours.

The heating step will be explained. The heating step is a step of obtaining the sulfide solid electrolyte according to the present disclosure by heating the amorphized ion conductive material. The crystallinity is improved by heating the amorphized ion conductive material.

The heating temperature is not particularly limited as long as the desired sulfide solid electrolyte may be obtained at the temperature, and the temperature is preferably higher than the temperature at which the sulfide solid electrolyte is crystallized. Specifically, the heating temperature is preferably 230° C. or more, more preferably 240° C. or more, further preferably 250° C. or more, and further more preferably 260° C. or more. Meanwhile the heating temperature is preferably low as possible in light of workability and safety, and specifically, is preferably 500° C. or less, more preferably 400° C. or less, further preferably 350° C. or less, and further preferably 300° C. or less. Incidentally, although Patent Literatures 4 and 5 disclose Li—P—S based sulfide solid electrolyte material including an oxygen (O), they add a melting step at 615° C. or more (Patent Literature 4) or at 550° C. or more (Patent Literature 5), and compared to these, the sulfide solid electrolyte may be obtained easily in the method for producing according to the present disclosure.

Also, the heating time is preferably adjusted appropriately so that the desired sulfide solid electrolyte may be obtained. The heating time for obtaining the sulfide solid electrolyte according to the present disclosure may be approximately 4 hours, and the sulfide solid electrolyte may be obtained easily. Further, when cooled to the room temperature after the heating, natural cooling may be employed, or annealing may be carried out in order to obtain the desired sulfide solid electrolyte.

In a series of steps for producing the solid electrolyte material, the operations are preferably carried out under an inert gas (such as Ar) atmosphere, in order to prevent the deterioration of the raw material and the obtained solid electrolyte material due to moisture in the air.

EXAMPLES

Hereinafter, the present disclosure will be described in more details with reference to Examples. Incidentally, the following Examples do not limit the present disclosure.

<Production of $Li_{4-4y-x}P^{4+}{}_{1+y-x}P^{5+}{}_{x}S_{4-z}O_{z}$ Based Sample>

In a glove box under an argon atmosphere, $Li_2S$, $P_2S_5$, $P_2O_5$, and P (pure phosphorus) were prepared as starting materials. $Li_2S$ was micronized at 380 rpm by ball mill for 10 hours to 40 hours, $P_2S_5$ and $P_2O_5$ were respectively micronized by vibrating mill for 30 minutes, P (pure phosphorus) was ground (micronized) by hand for 5 minutes, and were weighed. A mixed sample was prepared by mixing the micronized raw materials by hand for 5 minutes, and further mixing at 380 rpm by ball mill for 40 hours. A pellet of φ 13 mm was formed by charging the mixed sample into a pelleter and applying the pressure of 20 MPa to the pelleter using an uniaxial pressing machine. This pellet was sealed into a carbon-coated quartz tube under nearly vacuum of 10 Pa. Then, the temperature of the quartz tube including the pellet was elevated to 260° C. in 2 hours, the temperature was maintained for 4 hours, and then, was naturally cooled. Further, the resultant was ground for the evaluation thereafter.

Figure 3:
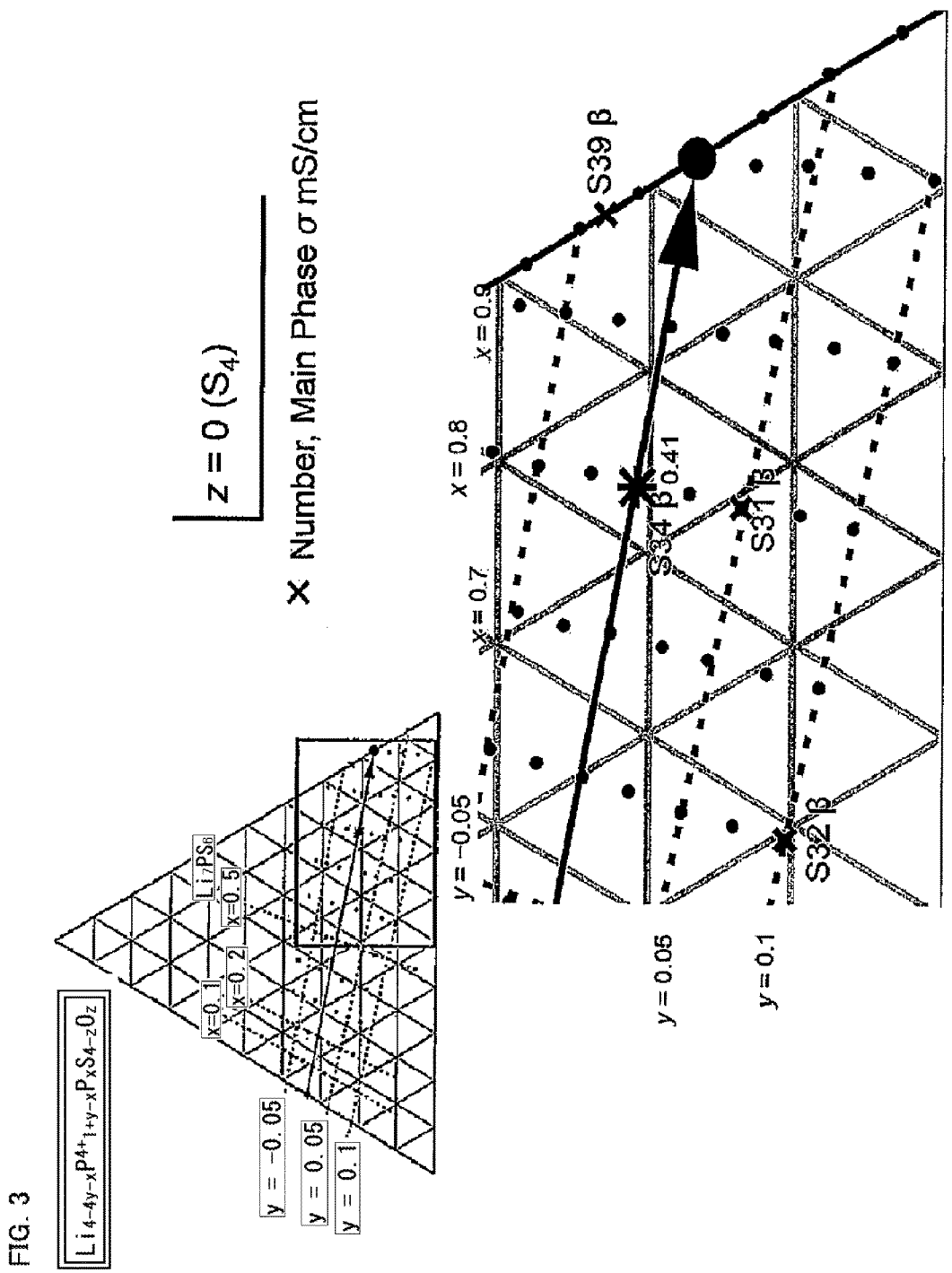
FIG. 3 is a ternary composition diagram of $Li_{4-4y-x}P^{4+}_{1y-x}P^{5+}_xS_{4-z}O_z$ (Z=0).
Figure 4:
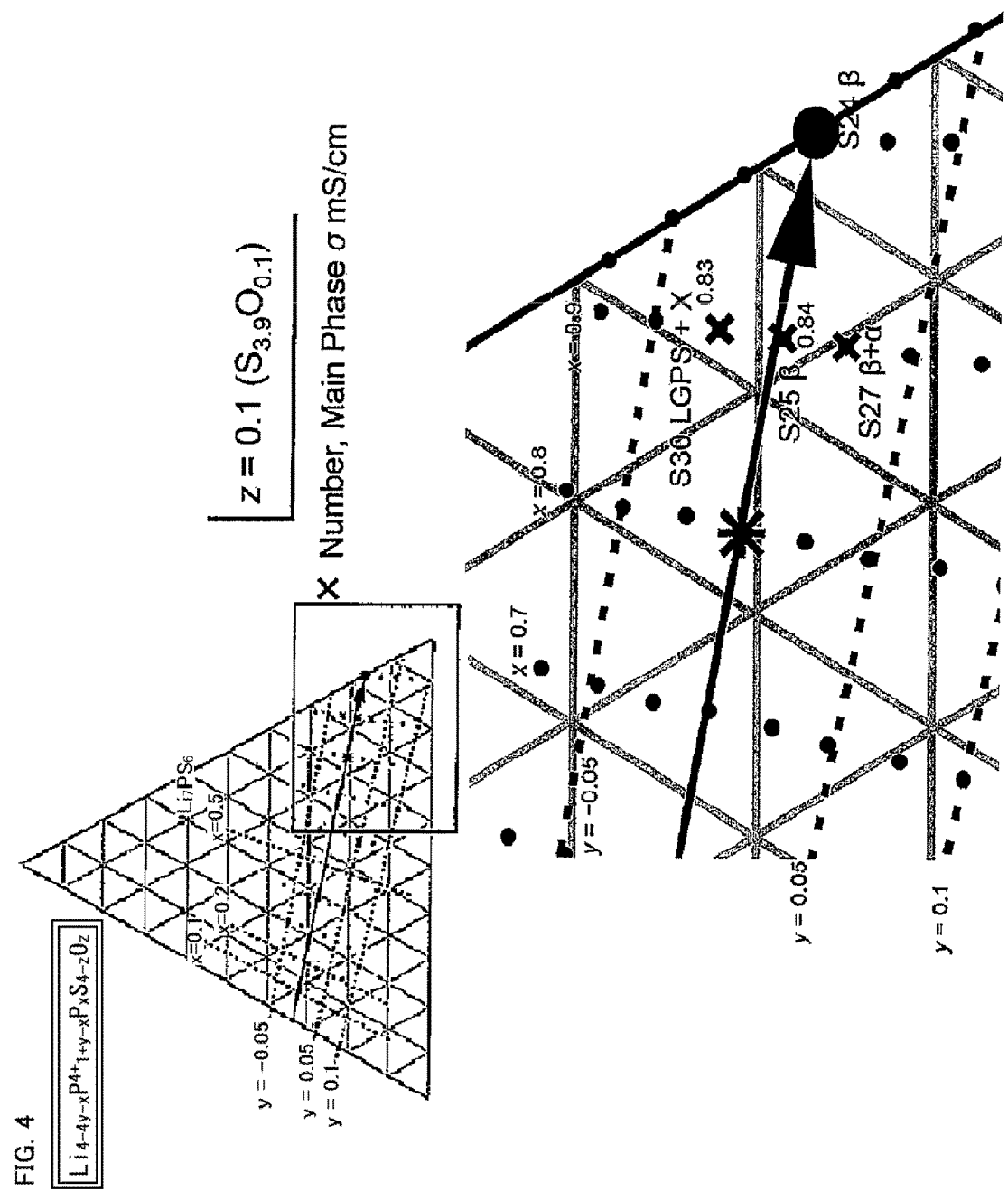
FIG. 4 is a ternary composition diagram of $Li_{4-4y-x}P^{4+}_{1+y-x}P^{5+}_xS_{4-z}O_z$ (z=0.1).
Figure 5:
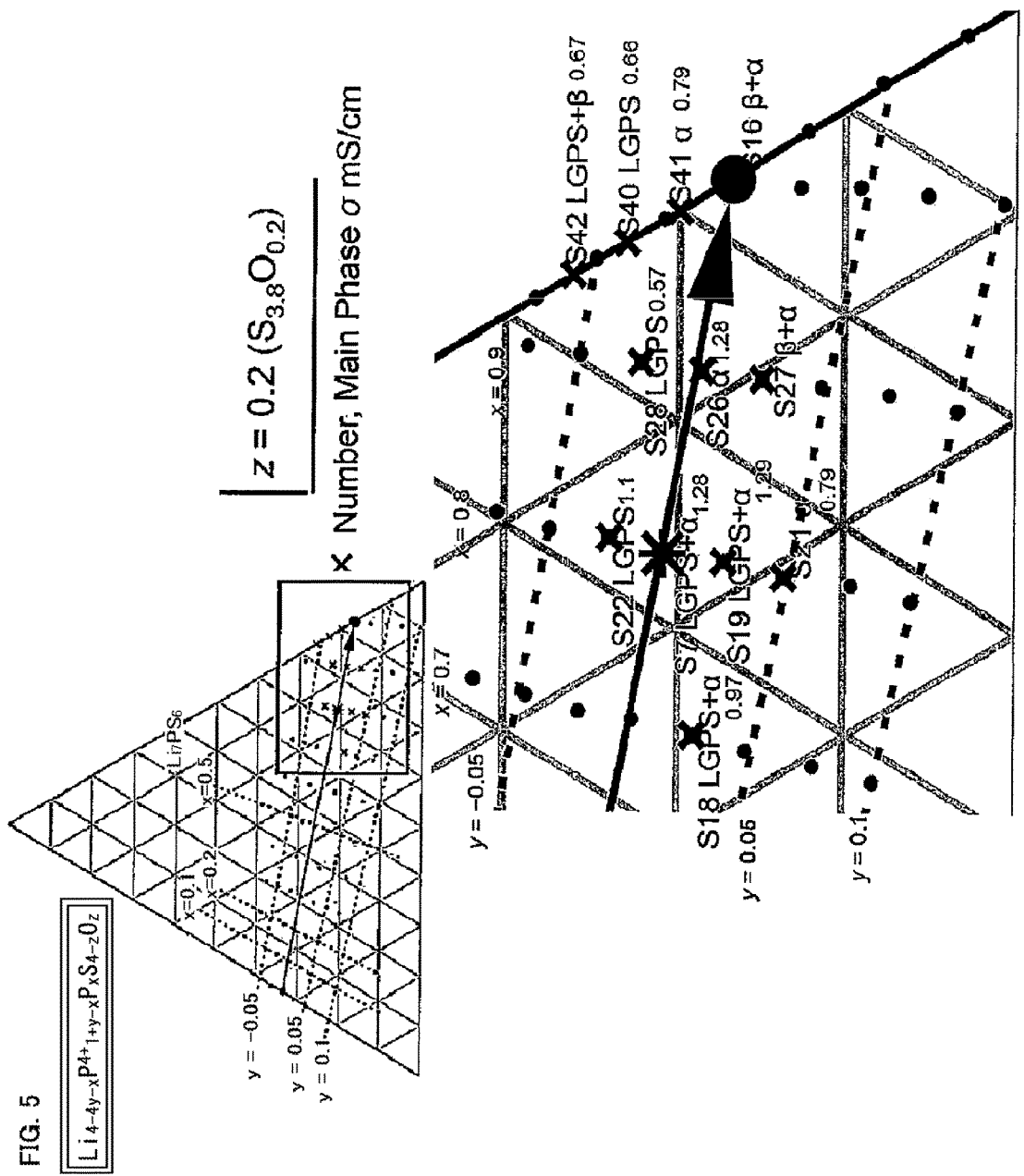
FIG. 5 is a ternary composition diagram of $Li_{4-4y-x}P^{4+}_{1+y-x}P^{5+}_xS_{4-z}O_z$ (z=0.2).

The composition of the synthesized sample was plotted in the ternary diagram in FIGS. 3 to 5 with a mark of X. Each ternary diagram in FIGS. 3 to 5 is a magnification of that cut out from the composition diagram of a triangular prism shape in FIG. 1, at z=0 (FIG. 3), z=0.1 (FIG. 4), and z=0.2 (FIG. 5). In the vicinity of the plotted X, the number of the sample (such as S01), a main crystal structure, and an ion conductivity σ (mS/cm) were shown together. Also, in each FIGS. 3 to 5, guide lines of x and y relating the composition ratio in the composition formula $Li_{4-4y-x}P^{4+}{}_{1+y-x}P^{5+}{}_{x}S_{4-z}O_{z}$ were shown together.

The following measurement and evaluation were carried for the obtained samples.

<Powder X-Ray Diffraction Measurement>

In order to identify the crystal included in the produced samples a powder X-ray diffraction measurement was carried out by using a powder X-ray diffraction apparatus Ultima-IV (manufactured by Rigaku Corporation) and Smart Lab (manufactured by Rigaku Corporation). For the powder X-ray diffraction measurement, a Cu-Kα ray having the X-ray wavelength of 1.5418 angstrom was used. The powder X-ray diffraction measurement was carried out in a range of 10° to 35° and at step intervals in diffraction angle (2θ) of 0.01°.

<Ion Conductivity Measurement of Sintered Pellet>

A pellet was produced by charging the ground sample into a cell for sintered pellet, and then, applying the pressure of 169 MPa to a cell for normal temperature. Then, a sintered pellet including the solid electrolyte material (sulfide solid electrolyte) of various compositions was obtained by sintering for 12 hours at 550° C. A sample for measuring was produced so as the radius of the pellet was approximately 10 mm and the thickness was in a range of 1 mm to 2 mm. Au electrodes were stuck together to the sample for measuring to obtain a battery of Au/sample for measuring/Au. A Frequency Response Analyzer manufactured by NF Corporation was used for the measuring the ion conductivity of the sample for measuring. The alternating current impedance measurement was carried out to measure the ion conductivity of the sample under the following conditions: the measuring range of 15 MHz to 100 Hz, the measuring temperature of 26° C. to 127° C., the alternating voltage of 50 mV to 100 mV, and the integrating time of 2 seconds. Also, as Comparative Examples, investigations were carried out for the ion conductivity when the solid electrolyte materials that are different from the solid electrolyte material according to the present disclosure were used.

[Evaluation]

<Powder X-Ray Diffraction>

Figure 6:
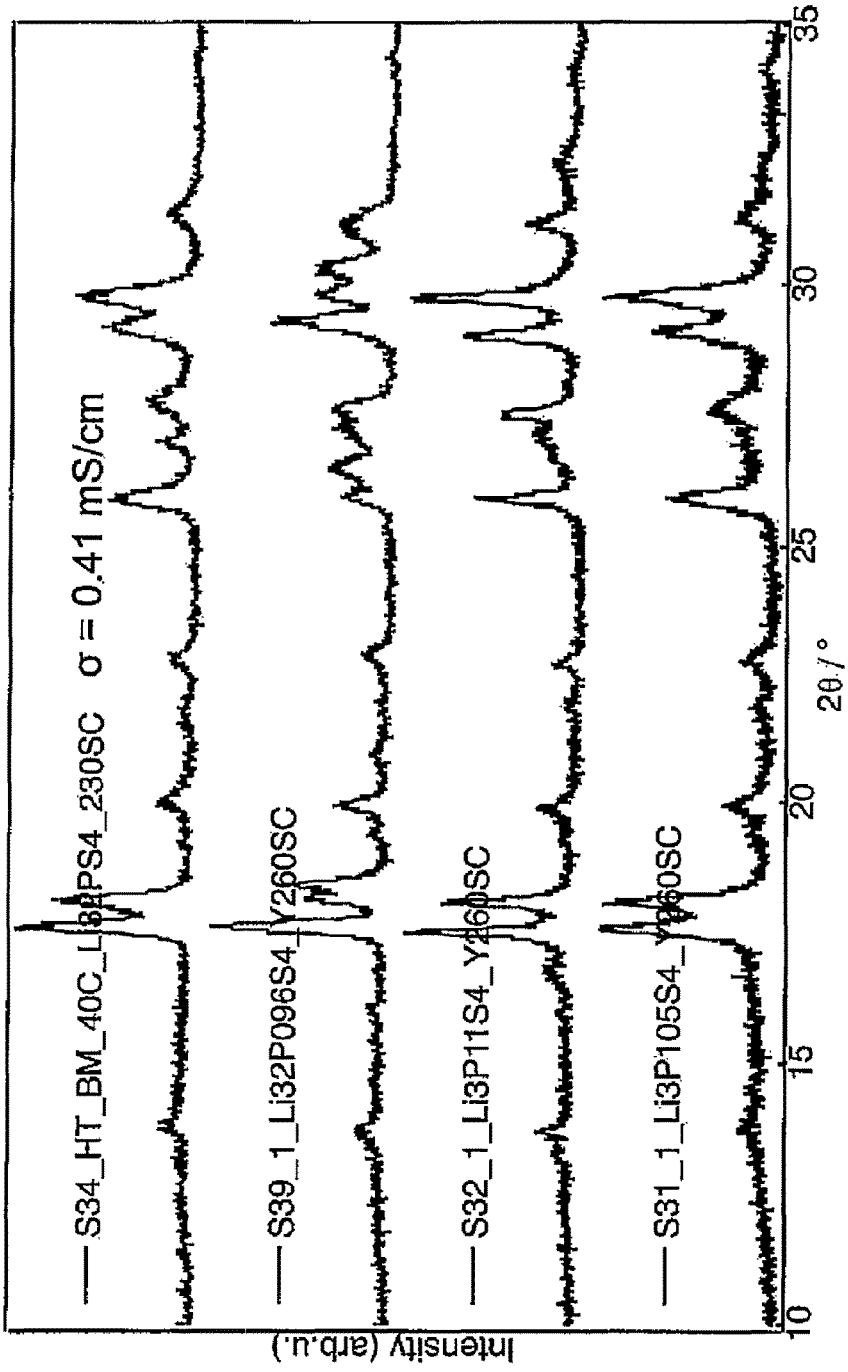
FIG. 6 is an X-ray diffraction diagram of the sulfide solid electrolyte having a composition of $Li_{4-4y-x}P^{4+}_{1y-x}P^{5+}_xS_{4-z}O_z$ (z=0).
Figure 7:
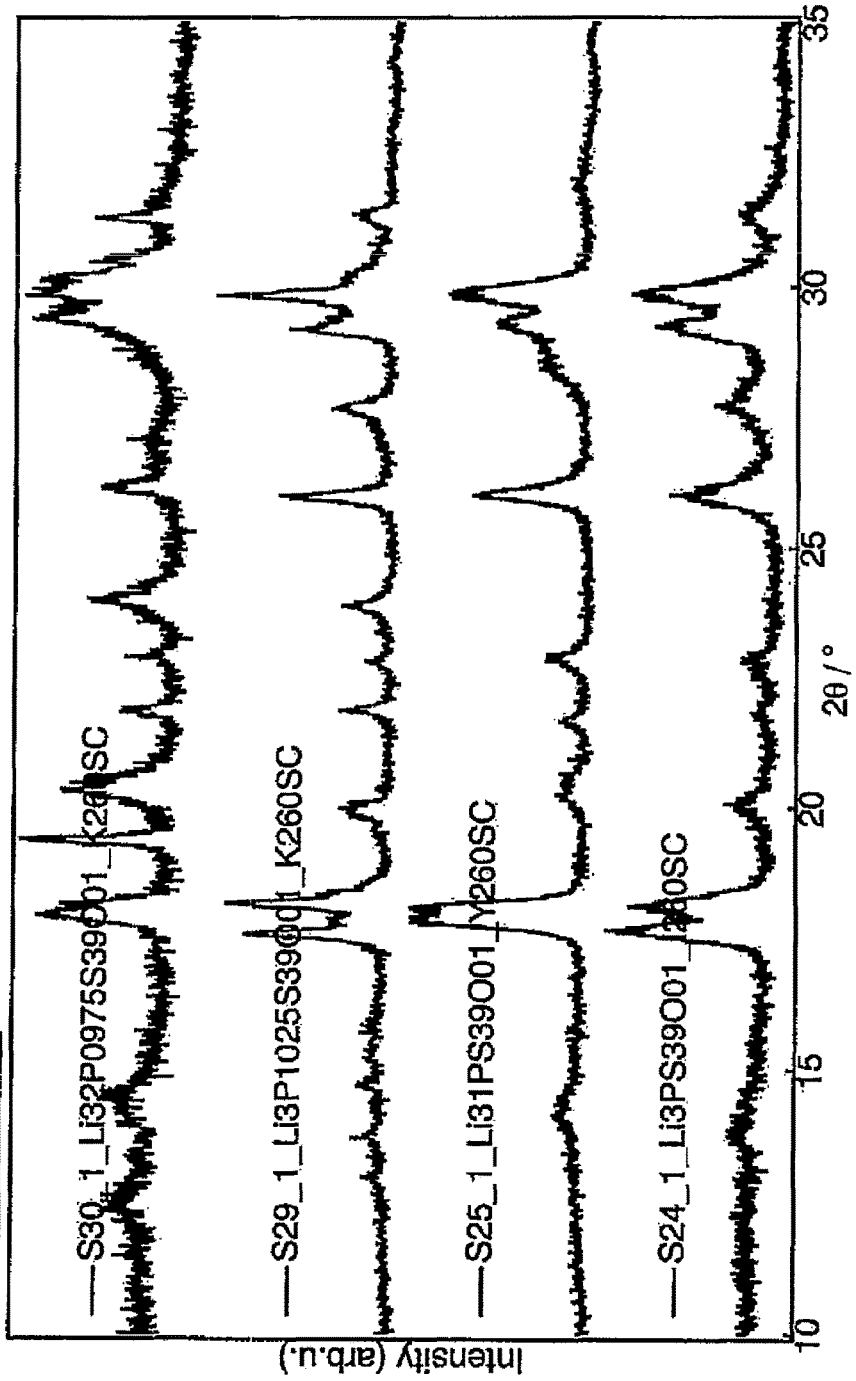
FIG. 7 is an X-ray diffraction diagram of the sulfide solid electrolyte having a composition of $Li_{4-4y-x}P^{4+}_{1+y-x}P^{5+}_xS_{4-z}O_z$ (z=0.1).
Figure 8:
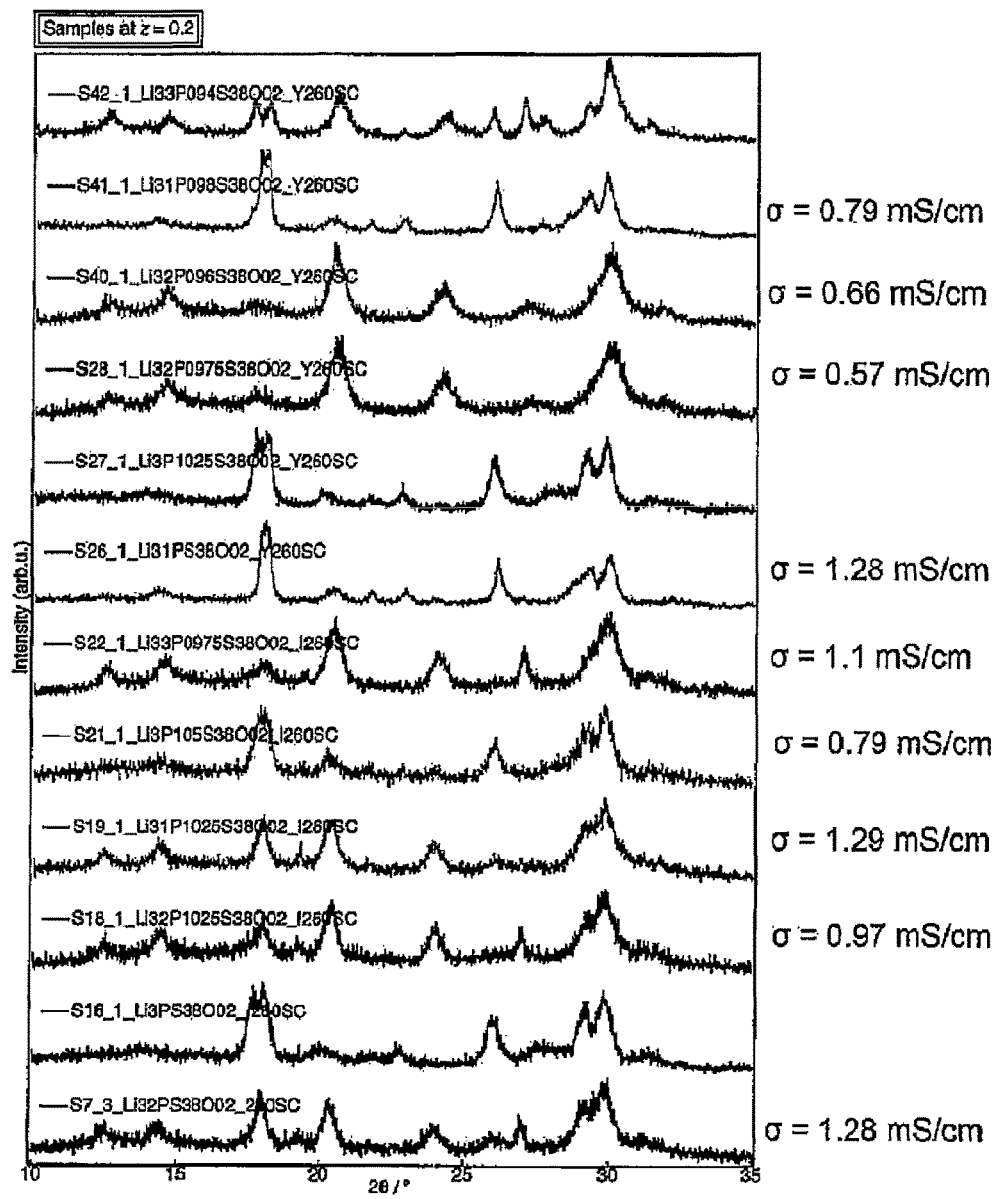
FIG. 8 is an X-ray diffraction diagram of the sulfide solid electrolyte having a composition of $Li_{4-4y-x}P^{4+}_{1+y-x}P^{5+}_xS_{4-z}O_z$ (Z=0.2).
Figure 9:
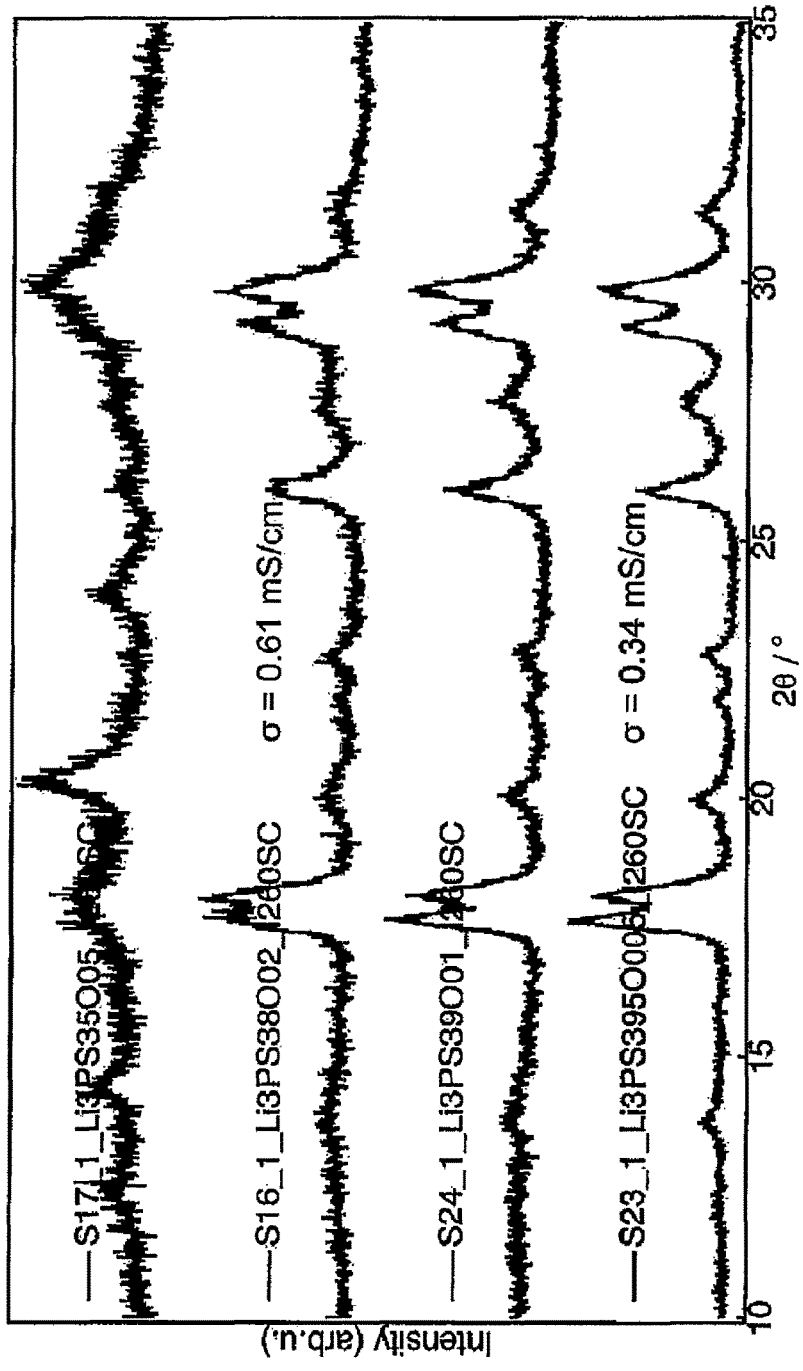
FIG. 9 is a diagram showing the X-ray diffraction peaks of each composition, when z is varied from 0 to 0.5 in the composition of $Li_3PS_{4-z}O_z$, next to each other.
Figure 10:
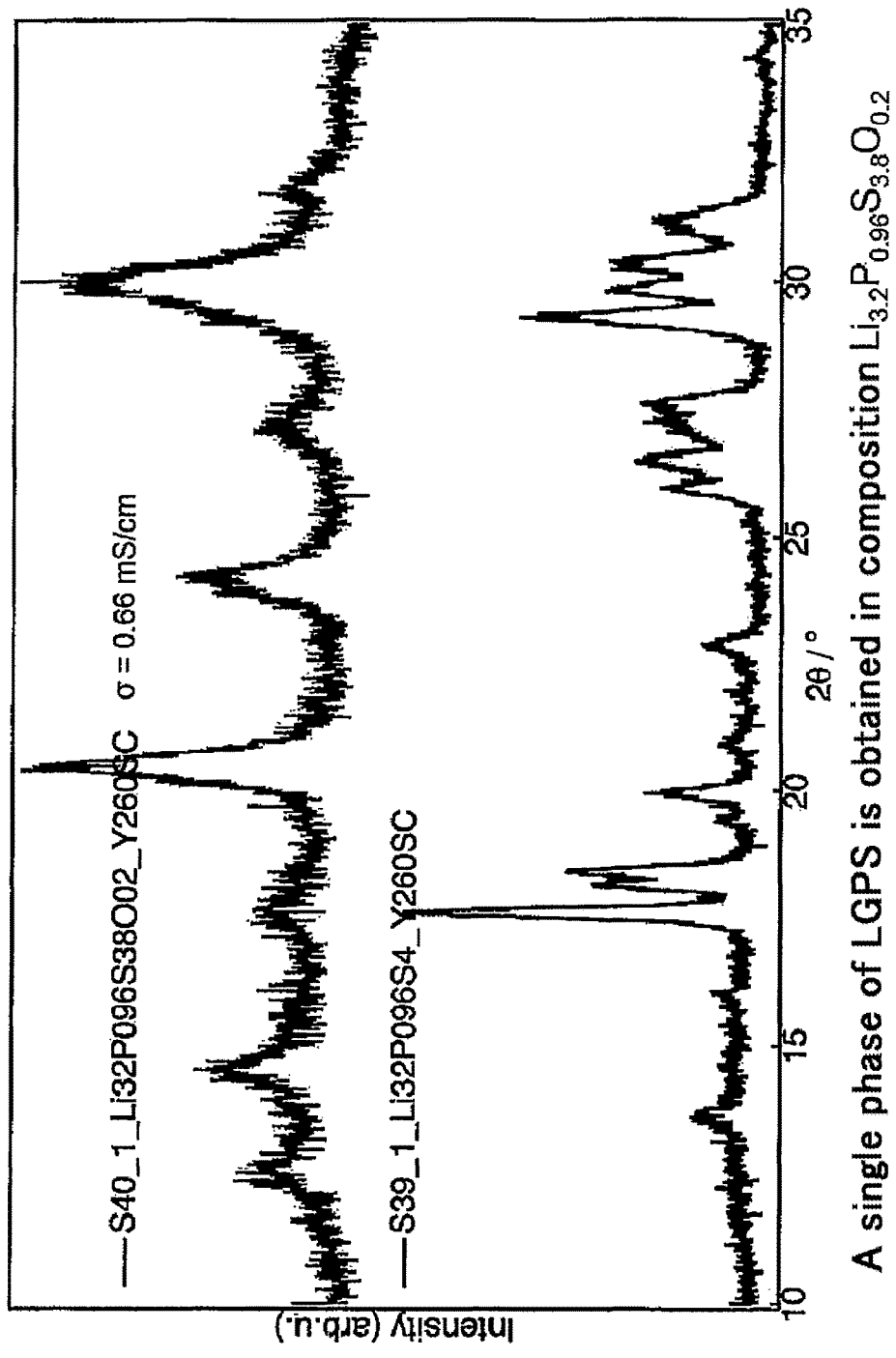
FIG. 10 is a diagram showing the X-ray diffraction peaks of each composition, when z is varied from 0 to 0.2 in the composition of $Li_{3.2}P_{0.96}S_{4-z}O_z$, next to each other.

By using the solid electrolyte material plotted in the ternary diagrams in FIGS. 3 to 5, an X-ray diffraction (XRD) measurement was carried out. A part of the results thereof are shown in FIGS. 6 to 8. FIGS. 6 to 8 are respectively X-ray diffraction of the composition of z=0, z=0.1, and z=0.2. A peak was confirmed in the solid electrolyte material having any one of these compositions, and the possession of a crystal structure was suggested. As z increases from 0, that is, as the oxygen (O) amount increases, a tendency of the crystal structure to change from the β type crystal structure to the α type crystal structure, and further to change to the LGPS type crystal structure, was confirmed. FIG. 9 shows X-ray diffraction peaks of each composition, when z was varied from 0 to 0.5 in the composition of $Li_3PS_{4-z}O_z$ next to each other; the peak of the β type crystal structure was found when z=0 and 0.1, the peak of the α type crystal structure was found when z=0.2, and the peak of the LGPS type crystal structure was found when z=0.5. FIG. 10 shows X-ray diffraction peaks of each composition, when z was varied from 0 to 0.2 in the composition of $Li_{3.2}P_{0.96}S_{4-z}O_z$ next to each other; the peak of the β type crystal structure was confirmed when z=0, whereas the peak of the LGPS type crystal structure was confirmed when z=0.2.

Figure 11:
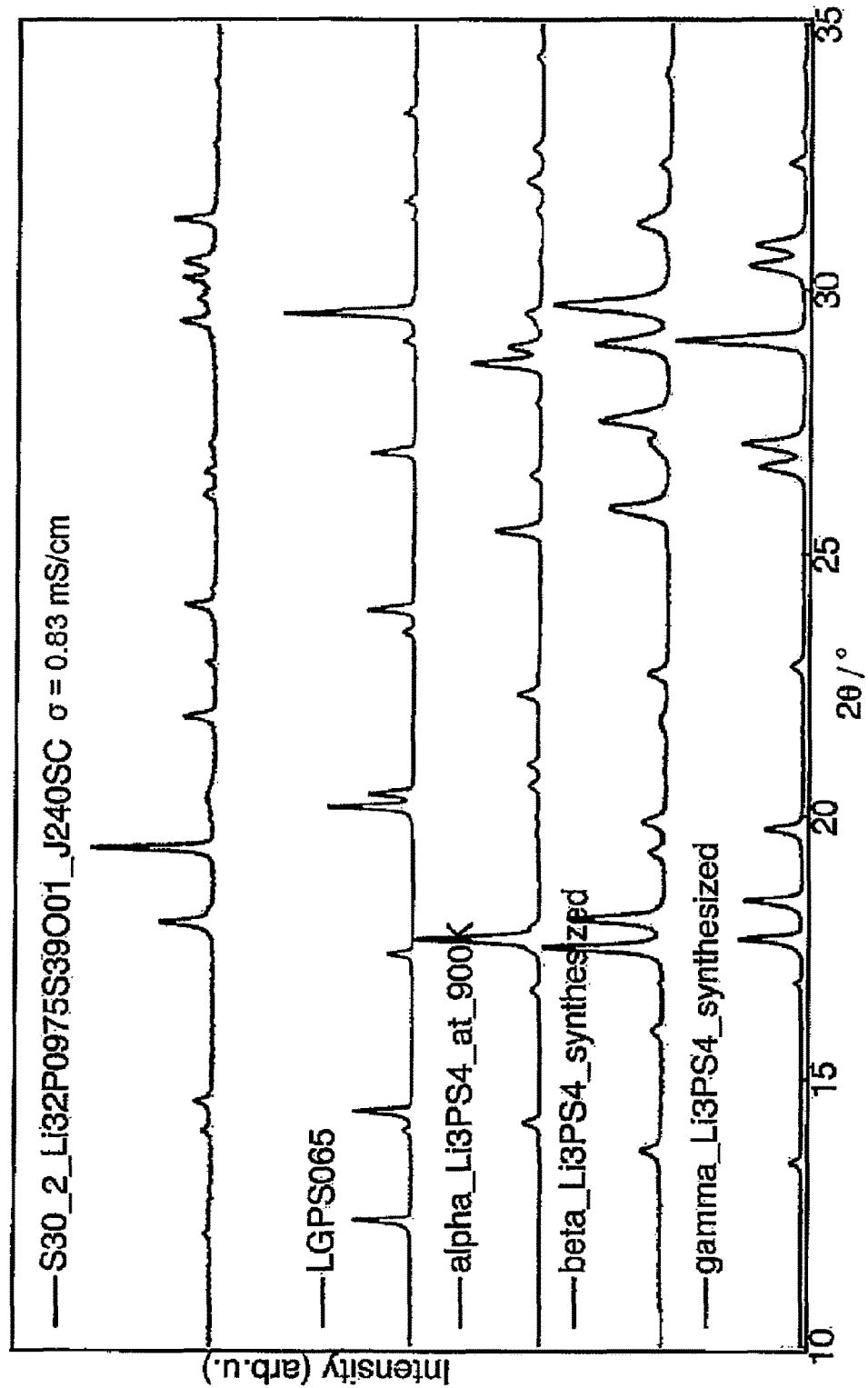
FIG. 11 is a diagram showing the X-ray diffraction peak results of a new phase A and the peaks of the known crystal structures, next to each other.

Further, a new crystal structure A, different from the conventionally known crystal structures, was also found. FIG. 11 shows the X-ray diffraction peak result of the new phase A and the peaks of a known crystal structures next to each other. The distinguishing peaks of the new phase A were found at the positions of 2θ=18.0°±0.1°, 19.4°±0.1°, 21.9°±0.1°, 24.0°±0.1° and 31.3°±0.1°. Particularly, the largest peak was located at 19.4°±0.1°, and it was confirmed that it is a peak due to the new crystal structure of the sulfide solid electrolyte by referring to the later described ion conductivity results, for example.

Figure 12A:
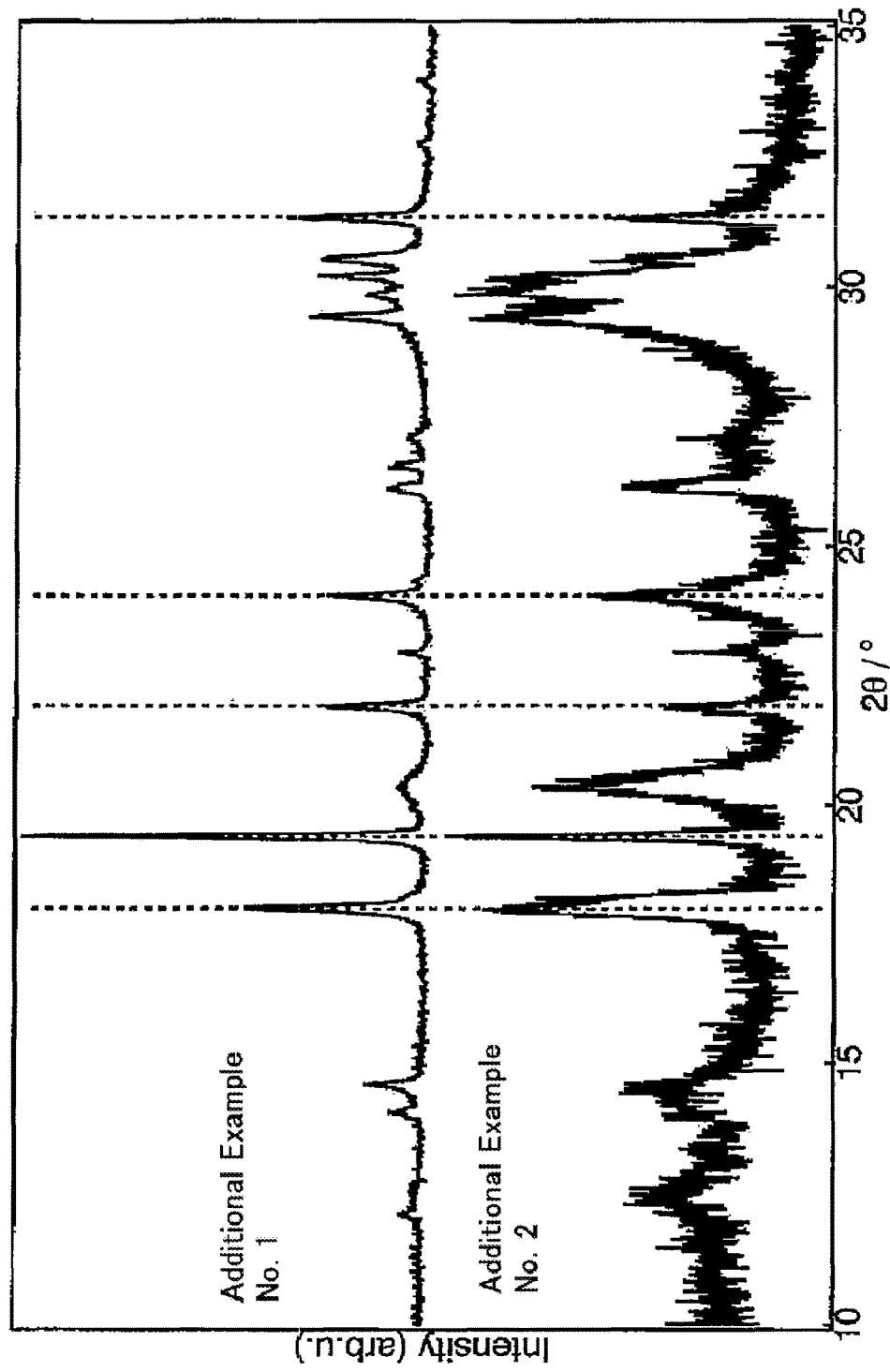
FIG. 12A is a diagram showing the X-ray diffraction measurement results in replicating tests to confirm the new phase A.

FIG. 12A shows the results of the X-ray diffraction measurement of the samples synthesized additionally for replicating tests to confirm the new phase A. Incidentally, samples were produced in Additional Examples 1 and 2 in the same manner as the above described sample production except that the composition was $Li_{3.2}P_{0.975}S_{3.9}O_{0.1}$ and that the heating temperature was 260° C. in Additional Example 2. Both of the X-ray diffraction charts in Additional Examples 1 and 2 had five distinguishing diffraction peaks, and the expression of the new phase A was confirmed again.

TABLE 1

| Additional Example No. | Composition | Ball mill | Burning |
|---|---|---|---|
| 1 | $Li_{3.2}P_{0.975}S_{3.9}O_{0.1}$ | 380 rpm for 40 hours | 240° C. for 4 hous |
| 2 | $Li_{3.2}P_{0.975}S_{3.9}O_{0.1}$ | 380 rpm for 40 hours | 260° C. for 4 hous |

Further, samples having the following compositions were synthesized in Additional Examples 3 to 5 under the following production conditions, and the X-ray diffraction measurements were carried out for the samples. The results are shown in FIG. 12B. Every X-ray diffraction chart in Additional Examples 3 to 5 had five distinguishing diffraction peaks, and the expression of the new phase B was confirmed.

TABLE 2

| Additional Example No. | Composition | Ball mill | Burning |
|---|---|---|---|
| 3 | $Li_{3.2}PS_{3.85}O_{0.15}$ | 380 rpm for 40 hours | 260° C. for 4 hous |
| 4 | $Li_{3.3}PS_{3.9}O_{0.1}$ | 380 rpm for 40 hours | 280° C. for 4 hous |
| 5 | $Li_{3.2}PS_{3.9}O_{0.1}$ | 380 rpm for 40 hours | 280° C. for 4 hous |

<Ion Conductivity of Sintered Pellet>

Figure 13:
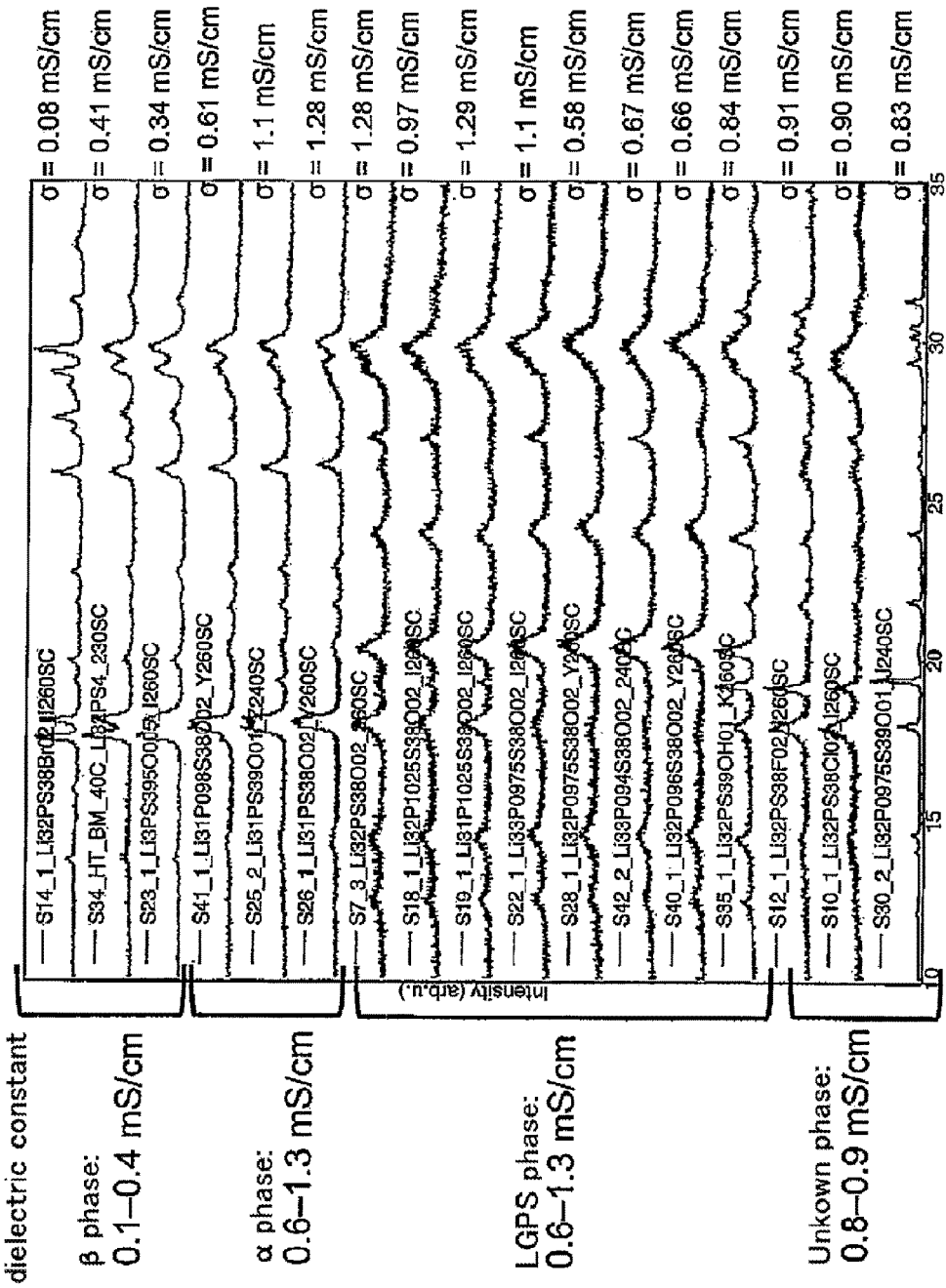
FIG. 13 is a diagram showing the ion conductivity of the solid electrolyte materials according to the present disclosure together with X-ray diffraction charts thereof.

The ion conductivity of the sintered pellets, obtained by sintering the powder of the obtained $Li_{4-4y-x}P^{4+}_{1+y-x}P^{5+}_{x}S_{4-z}O_{z}$ based samples, were measured at 26° C. to 127° C. FIG. 13 is a diagram showing the above described ion conductivities together with X-ray diffraction charts thereof. The ion conductivities σ obtained by this were: in a range of 0.1 mS/cm to 0.4 mS/cm for the β phase (however, the one of σ=0.1 is a composition including Br, and is a reference data out of the composition range according to the present disclosure), in a range of 0.6 mS/cm to 1.3 mS/cm for the α phase, in a range of 0.6 mS/cm to 1.3 mS/cm for the LGPS phase, and in a range of 0.8 mS/cm to 0.9 mS/cm for the new phase A. Incidentally, the ion conductivity of the one having the new phase B shown in FIG. 2B was also measured, and was in a range of 1.2 mS/cm to 1.3 mS/cm. These are comparable to the ion conductivities reported for the conventional LGPS type solid electrolytes.

What is claimed is:

1. A solid electrolyte material comprising a sulfide composition represented by a composition formula $Li_{4-4y-x}P^{4+}_{1+y-x}P^{5+}_{x}S_{4-z}O_{z}$ ($Li_{4-4y-x}P_{1+y}S_{4-z}O_{z}$), wherein $0.6 \leq x < 1$, $0 \leq z \leq 0.2$, and $-0.025 \leq y \leq 0.1$.

2. The solid electrolyte material according to claim 1, wherein the solid electrolyte material has a peak at a position of $2\theta=29.58°\pm0.50°$ in X-ray diffraction measurement using a CuKα ray, and
   the solid electrolyte material does not have a peak at a position of $2\theta=27.33°\pm0.50°$ in X-ray diffraction measurement using a CuKα ray, or when the solid electrolyte material has a peak at the position of $2\theta=27.33°\pm0.50°$, a diffraction intensity of the peak at $2\theta=29.58°\pm0.50°$ is regarded as $I_A$, and a diffraction intensity of the peak at $2\theta=27.33°=0.50°$ is regarded as $I_B$, a value of $I_B/I_A$ is less than 0.50.

3. The solid electrolyte material according to claim 1, wherein the solid electrolyte material has a peak at a position of $2\theta=17.90°\pm0.20°$, $29.0°\pm0.50°$, and $29.75°\pm0.25°$ in X-ray diffraction measurement using a CuKα ray, and
   the solid electrolyte material does not have a peak at a position of $2\theta=18.50°+0.20°$ in X-ray diffraction measurement using a CuKα ray, or when the solid electrolyte material has a peak at the position of $2\theta=18.50°\pm0.20°$, a diffraction intensity of the peak at $2\theta=17.90°\pm0.20°$ is regarded as $I_C$, and a diffraction intensity of the peak at $2\theta=18.50°\pm0.20°$ is regarded as $I_D$, a value of $I_D/I_C$ is less than 0.50.

4. The solid electrolyte material according to claim 1, wherein the solid electrolyte material has a peak at a position of $2\theta=18.0°\pm0.1°$, $19.4°\pm0.1°$, $21.9°\pm0.1°$, $24.0°\pm0.1°$ and $31.3°\pm0.1°$ in X-ray diffraction measurement using a CuKα ray.

5. The solid electrolyte material according to claim 1, wherein the solid electrolyte material has a peak at a position of $2\theta=17.8°\pm0.1°$, $19.1°\pm0.1°$, $21.7°\pm0.1°$, $23.8°\pm0.1°$ and $30.85°\pm0.1°$ in X-ray diffraction measurement using a CuKα ray.

6. The solid electrolyte material according to claim 1, wherein ion conductivity is 0.4 mS/cm or more.

7. A method for producing the solid electrolyte material according to claim 1, the method comprising:
   an ion conductive material synthesizing step of synthesizing an ion conductive material using a simple substance of P, a P compound, a S compound, a Li compound, and an O compound as a raw material including a constituent of the sulfide composition; and
   a heating step of obtaining the sulfide composition by heating the ion conductive material.

8. The method according to claim 7, wherein a heating temperature in the heating step is in a range of 230° C. to 300° C.

* * * * *